July 31, 1962  C. J. KINNISON  3,047,315
SPRING URGED BALL AND SOCKET EXHAUST PIPE CONNECTOR
Filed Feb. 5, 1960

INVENTOR.
Court J. Kinnison
BY
Attorneys

United States Patent Office 3,047,315
Patented July 31, 1962

3,047,315
SPRING URGED BALL AND SOCKET
EXHAUST PIPE CONNECTOR
Court J. Kinnison, Oakland, Calif., assignor to Western
Piping & Engineering Co., Inc., San Francisco, Calif.
Filed Feb. 5, 1960, Ser. No. 6,947
1 Claim. (Cl. 285—269)

My invention relates to devices primarily useful in interconnecting various portions of the exhaust mechanism of an internal combustion engine, such as a gasoline engine or a diesel engine, and is particularly concerned with a connector for permitting movement of different sections of the exhaust mechanism relative to each other without substantial loss of gas and with only a small amount of mechanism.

As vehicular internal combustion engines have gotten larger and larger, the problem of disposing of their exhaust gases has become increasingly acute. Some installations require a substantial amount of relative movement between the internal combustion engine itself and subsequent devices in the exhaust system such as the muffler. Most installations require at least a small amount of movement to take care of the normal weaving and vibration of the various parts. Various solutions of this problem have been advanced, usually involving the use of flexible tubing. While in some instances this work admirably for a while, it is not particularly designed for protracted satisfaction and in some instances does not have the range of movement requisite.

It is therefore an object of my invention to provide an exhaust pipe connector in which there is relatively a very wide range of motion to take care not only of minor vibrational oscillations but also of major movements due to large shifting of the components relative to each other, for example, as in a tilt cab truck.

Another object of the invention is to provide an exhaust pipe connector which can readily be installed by most any mechanic in the customary environment and with the usual tools.

A still further object of the invention is to provide an improved exhaust pipe connector which can easily, economically and quickly be fabricated.

A still further object of the invention is to provide an exhaust pipe connector having a wide range of relative movement which, however, remains tight over a protracted period.

Another object of the invention is to provide an exhaust pipe connector which introduces little or no impedance to exhaust flow.

A still further object of the invention is to provide an exhaust pipe connector which can take care of relative angular movement of various successive portions of an exhaust system and can also take care of relative axial movement of those portions of an exhaust system.

A still further object of the invention is, in general, to provide an improved exhaust pipe connector.

Other objects of the invention, together with the foregoing, are attained in the embodiments of the invention described in the accompanying description and illustrated in the accompanying drawings, in which.

Figure 1:
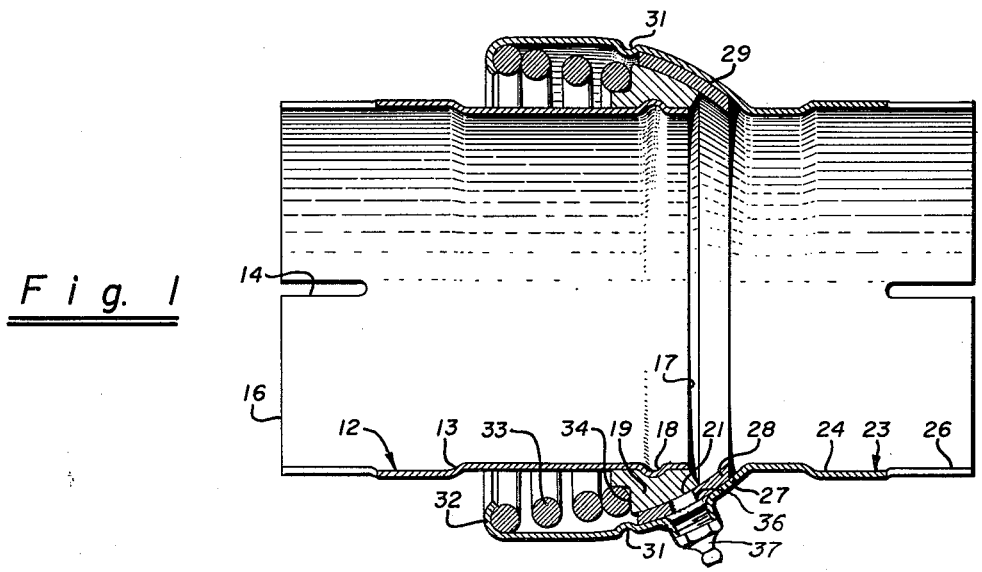
FIGURE 1 is a cross-section on a longitudinal and diametrical plane through an exhaust pipe connector constructed in accordance with the invention, the parts being shown in axial alignment.

While the exhaust pipe connector according to the invention can be fabricated in a large number of different ways, depending upon the particular environmental conditions it must meet, it has successfully been embodied in the commercial forms described and illustrated herein.

In the first of these forms, there is afforded a connector including a pipe 12 conveniently fabricated of relatively thin wall tubing such as steel tubing. The pipe 12 has a slight enlargement 13 adjacent one end and a number of slots 14 axially extending into the pipe from the edge 16 thereof in order that the enlargement 13 can readily be telescoped over and can easily receive the end of another portion of the exhaust system. It is contemplated that the customary contracting band or clamp will be constricted about the enlargement 13 in order to afford a tight connection between it and the adjacent portion of the exhaust system, not shown.

The pipe 12 adjacent one end 17 is also provided with an externally projecting, integrally formed bead 18 constituting a slight enlargement of this end of the pipe. Designed to encompass the end of the pipe and to be anchored firmly by the bead 18 is a band 19 of special bearing material, for example, cast iron. The band 19 is conveniently a continuous piece and can either be cast on the end of the pipe 12 or can be formed of substantially the cross-section shown with the end of the pipe later being expanded into the band 19. In either case, a firm interconnection is made between the band and the pipe end.

The band 19 has substantially the configuration shown in FIGURE 1 and is particularly characterized by the provision of a convex spherical surface 21 of limited but sufficient extent to accommodate the angular movement anticipated.

Designed to cooperate with the pipe 12 is a conduit 23 likewise preferably made of thin wall tubing such as steel tubing and at one end having an enlargement 24. There are certain axially extending slits 26 in the conduit 23 so that the conduit can be telescoped over another portion of an exhaust system and with the use of the customary constricting band can be tightly affixed thereto.

The conduit 23 also has another enlargement 27 approximately in the shape of a portion of a sphere which is of sufficient extent to overlie and surround or encompass the adjacent portion of the pipe 12 but to be radially spaced therefrom. Within the enlargement 27 there is provided a ring 28 of a good bearing material such as steel contoured to afford a concave spherical surface 29 designed to mate with the convex spherical surface 21. The ring 28 is preferably held in position in any convenient way. In this instance, after the ring is installed and aligned it is firmly secured in position by an inturned bead 31 which is indented or spun into the enlargement 27.

The enlargement is furthermore contoured at its extremity to provide an inturned flange 32 extending toward the pipe 12 but radially spaced therefrom to afford the requisite angular movement. A helical spring 33 is lodged against the inturned flange 32 at one end and is also lodged against a seat 34 cut out of the band 19 so that the spring 33 is located in an axial direction and in a radial direction not only in connection with the enlargement of the conduit but also in connection with the pipe 12.

While the spherical mating surfaces of the band 19 and of the ring 28 can be operated without extraneous lubrication, in many instances it is preferred to supply a high temperature lubricant such as a special grease or a silicone material. For this reason, a groove 36 is provided in the ring 28 with which a lubricant fitting 37 communicates. The lubricant helps make a better seal against leakage and reduces friction and wear.

With this structure installed as described, the spring 33 forces the band 19 into close abutment with the ring 28 so that there is afforded a substantially leak-proof junction. Also, the force of the spring is sufficient to hold the convex and concave areas of the ring and of the band in close juxaposition despite the pressure of the exhaust gas which tends to separate them. This is even true for moderate backfires, although under excessive backfiring conditions the spherical surfaces may momentarily separate slightly and afford, by compression of the spring 33, an emergency bypass outlet for the excessive exhaust gases. This tends to save the subsequent muffler in the system from disruption. During normal operation with the seats on the ring and on the band in contact, the pipe 12 can move angularly with respect to the conduit 23 and thus take up any minor vibrations or even some relatively swinging movements. The connecter is usually so installed, sometimes with other similar connections in series, as to compensate for variations in dimension due to change in temperature and is easily and quickly mounted and demounted by an ordinary mechanic with ordinary tools whenever desired.

Figure 2:
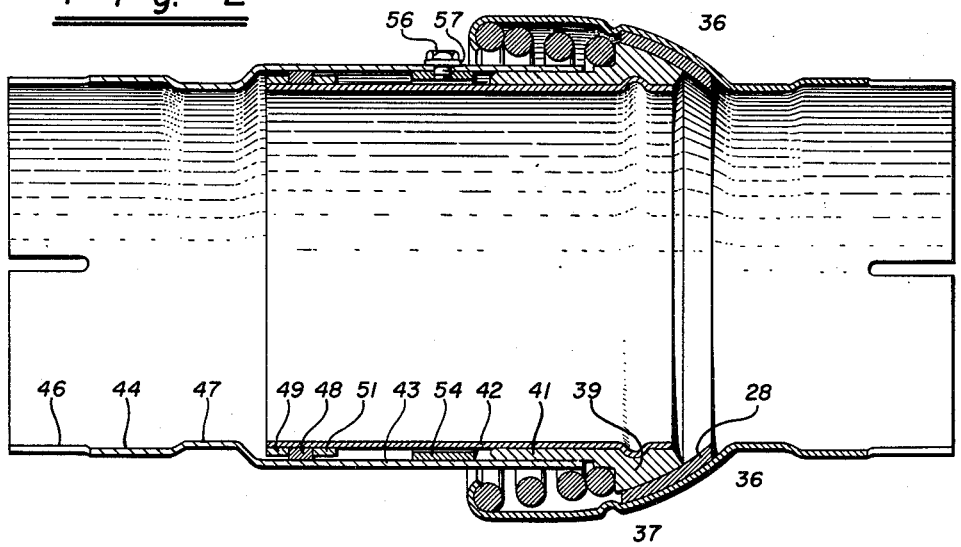
FIGURE 2 is a view similar to FIGURE 1 but showing a modification of the connector in which the parts are capable not only of relative swinging or rotational movement but also are capable of relative axial displacement.

In the form of the device shown in FIGURE 2, the parts are for the most part exactly as previously described. There is a change, however, in that the band 39 corresponding to the band 19 is provided with an extended collar 41. Designed to overlie the collar and to telescope with the pipe 41 is a tube 43. This conveniently is made of a thin wall material such as steel and has the customary enlarged end 44 and axial slots 46 therein for connection to a part of the exhaust mechanism as before. The tube 43 likewise has an enlarged portion 47 affording a smooth transition to the cylindrical portion which telescopes with the pipe 42. Not only does the collar 41 afford a good bearing for the tube 43 but this is augmented by an additional split bearing band 48 confined between abutment rings 49 and 51 so that the band 48 can yield slightly yet will afford a tight sliding engagement as the pipe and tube move with respect to each other axially. All of the moving parts, whether rotating or sliding, can be lubricated as described in connection with FIGURE 1, if desired.

To limit the relative axial movement, a stop strap 54 disposed within the tube 43 serves as a seat for a number of lock screws 56 engaged not only with the strap 54 but also with the tube 43. Thus, the lock screws 56 and the strap 54 serve as a limit for the amount of relative axial movement between the tube and the pipe. In this form of the invention, the parts cannot only swing, rotate and swivel as is true in connection with the FIGURE 1 device, but can also move relative to each other in an axial direction to a limited extent.

What is claimed is:

An exhaust pipe connector comprising a straight cylindrical pipe of uniformly thick, stiff metal; a rigid bearing band encircling the end of said pipe and having a seat on the end of said band away from said end of said pipe; said band having a spherical outer surface entirely disposed between said seat and said end of said pipe and diminishing in chordal diameter from said seat toward said end of said pipe and said band having a cylindrical inner surface with a circumferential groove therein; means for securing said band on said pipe including a circumferential bead on said pipe extending into said groove in said band; a straight conduit of uniformly thick, stiff metal; means at the end of and integral with said conduit forming a hollow spherically enlarged portion of said conduit overlying said end of said pipe; a rigid bearing ring within said enlarged portion, said ring having a spherical inner surface abutting said spherical surface of said band and said ring having a margin at the largest chordal diameter on said ring; means for securing said ring in said conduit including an inwardly extending circumferential bead on said enlarged portion engaging said margin of said ring; a spring surrounding said pipe and disposed within said enlarged portion with one end of said spring abutting said seat on said bearing band; and an inturned flange on the end of said conduit and integral with said enlarged portion in abutment with the other end of said spring and in position to hold said pipe and said conduit permanently assembled.

References Cited in the file of this patent

UNITED STATES PATENTS

| | | |
|---|---|---|
| 1,154,984 | Forth | Sept. 28, 1915 |
| 2,219,752 | Rohr | Oct. 29, 1940 |
| 2,295,907 | Lewis | Sept. 15, 1942 |
| 2,329,369 | Haver | Sept. 14, 1943 |
| 2,776,168 | Schweda | Jan. 1, 1957 |
| 2,836,436 | Bianchi | May 27, 1958 |

FOREIGN PATENTS

| | | |
|---|---|---|
| 605,502 | France | Feb. 19, 1926 |
| 401,458 | Great Britain | Nov. 16, 1933 |
| 835,820 | Germany | Apr. 3, 1952 |